(12) United States Patent
Zhao et al.

(10) Patent No.: US 11,993,026 B2
(45) Date of Patent: May 28, 2024

(54) MULTI-FUNCTIONAL INTERFACE/SURFACE LAYER FOR THERMOPLASTIC COMPONENTS

(71) Applicant: Raytheon Company, Waltham, MA (US)

(72) Inventors: Wenping Zhao, Glastonbury, CT (US); Lei Xing, East Hartford, CT (US); Danielle Grolman, Holden, MA (US); Orlando Mijares, Tucson, AZ (US); Mary K. Herndon, Littleton, MA (US); Sridhar Siddhamalli, Tucson, AZ (US)

(73) Assignee: Raytheon Company, Tewksbury, MA (US)

(*) Notice: Subject to any disclaimer, the term of this patent is extended or adjusted under 35 U.S.C. 154(b) by 57 days.

(21) Appl. No.: 17/172,523

(22) Filed: Feb. 10, 2021

(65) Prior Publication Data

US 2022/0250334 A1 Aug. 11, 2022

(51) Int. Cl.
*B32B 27/00* (2006.01)
*B29C 65/00* (2006.01)
(Continued)

(52) U.S. Cl.
CPC ........ *B29C 66/73116* (2013.01); *B29C 65/02* (2013.01); *B29C 66/712* (2013.01);
(Continued)

(58) Field of Classification Search
CPC ......... B29C 65/00; B29C 65/02; B29C 66/70; B29C 66/71; B29C 66/712; B29C 66/72;
(Continued)

(56) References Cited

U.S. PATENT DOCUMENTS

2009/0277579 A1* 11/2009 Marelli ............... B29C 66/5344
156/293

FOREIGN PATENT DOCUMENTS

| JP | H0280059 A | 3/1990 |
|---|---|---|
| TW | 200821136 A | 5/2008 |

OTHER PUBLICATIONS

International Search Report and Written Opinion dated Jun. 13, 2022 in International App. No. PCT/US2022/015791.

* cited by examiner

*Primary Examiner* — Jacob T Minskey
*Assistant Examiner* — Matthew Hoover
(74) *Attorney, Agent, or Firm* — Bachman & LaPointe, P.C.

(57) ABSTRACT

A joint between dissimilar thermoplastic materials comprising a first thermoplastic material layer; a second thermoplastic material layer having a melting point temperature different from a melting point temperature of the first thermoplastic material layer; and an interface layer coupled between the first thermoplastic material layer and the second thermoplastic material layer; wherein the interface layer is configured to join the first thermoplastic material layer and the second thermoplastic material layer together to form the joint, wherein the interface layer comprises a melting point temperature having a value selected from the group consisting of between the melting point temperature of the first thermoplastic material layer and the melting point temperature of the second thermoplastic material layer; or lower than the melting point temperature of the first thermoplastic material layer and the melting point temperature of the second thermoplastic material layer.

8 Claims, 2 Drawing Sheets

(51) Int. Cl.
*B29C 65/02* (2006.01)
*B32B 27/08* (2006.01)
*B32B 27/28* (2006.01)
*B32B 27/36* (2006.01)

(52) U.S. Cl.
CPC ........ *B29C 66/721* (2013.01); *B29C 66/7311* (2013.01); *B32B 27/08* (2013.01); *B32B 27/288* (2013.01); *B32B 27/365* (2013.01); *B29C 66/70* (2013.01); *B32B 2250/03* (2013.01); *B32B 2250/24* (2013.01); *B32B 2307/30* (2013.01)

(58) Field of Classification Search
CPC ..... B29C 66/721; B29C 66/73; B29C 66/731; B29C 66/7311; B29C 66/73116; B32B 27/00; B32B 27/08; B32B 27/20; B32B 27/28; B32B 27/288; B32B 27/30; B32B 27/36; B32B 27/365; B32B 2250/00; B32B 2250/03; B32B 2250/20
See application file for complete search history.

MULTI-FUNCTIONAL INTERFACE/SURFACE LAYER FOR THERMOPLASTIC COMPONENTS

BACKGROUND

The present disclosure is directed to an interface configured to join two different thermoplastic materials during welding.

Thermoplastic composites are emerging as a replacement for thermoset composites in various applications because of their potential for rapid processing, weld-ability, high impact resistance and low cost. Joining dissimilar thermoplastics and/or their composites remains challenging, especially when the thermoplastics involved have very different processing temperatures.

One prior solution is adhesive bonding. For bonding thermoplastic such as polycarbonate (PC) to polyetheretherketon (PEEK), many process steps are required such as, surface treatment, applying adhesive, autoclave or oven heat cure (they are all needed). The entire process is very time consuming and costly. Another potential option for joining dissimilar thermoplastic materials is mechanical fastening. However mechanical fastening includes weight penalties, and also will not satisfy the sealing requirement for many of the joints required.

What is needed is a material interface that allows for two different thermoplastic materials/composites to be welded.

SUMMARY

In accordance with the present disclosure, there is provided a joint between dissimilar thermoplastic materials comprising a first thermoplastic material layer; a second thermoplastic material layer having a melting point temperature different from a melting point temperature of the first thermoplastic material layer; and an interface layer coupled between the first thermoplastic material layer and the second thermoplastic material layer; wherein the interface layer is configured to join the first thermoplastic material layer and the second thermoplastic material layer together to form the joint, wherein the interface layer comprises a melting point temperature having a value selected from the group consisting of between the melting point temperature of the first thermoplastic material layer and the melting point temperature of the second thermoplastic material layer; or lower than the melting point temperature of the first thermoplastic material layer and the melting point temperature of the second thermoplastic material layer.

A further embodiment of any of the foregoing embodiments may additionally and/or alternatively include at least one of the first thermoplastic material layer and the second thermoplastic material layer comprises a thermoplastic composite material.

A further embodiment of any of the foregoing embodiments may additionally and/or alternatively include the joint between dissimilar thermoplastic materials further comprises a surface treatment on at least one of the first thermoplastic material layer and the second thermoplastic material layer.

A further embodiment of any of the foregoing embodiments may additionally and/or alternatively include the first thermoplastic material layer and the second thermoplastic material layer can comprise at least one of polycarbonate; polyetherimide; polyphenylenesulfide; polyetherketoneketone; polyaryletherketone; and polyetheretherketone.

In accordance with the present disclosure, there is provided an attachment welded to a component via an interface layer comprising the attachment comprising a first thermoplastic material; the component comprising a second thermoplastic material having a melting point temperature different from a melting point temperature of the first thermoplastic material; and an interface layer coupled between the attachment and the component; wherein the interface layer is configured to join the first thermoplastic material and the second thermoplastic material together to form a welded joint, wherein the interface layer comprises a melting point temperature having a value selected from the group consisting of between the melting point temperature of the first thermoplastic material layer and the melting point temperature of the second thermoplastic material layer; or lower than the melting point temperature of the first thermoplastic material layer and the melting point temperature of the second thermoplastic material layer.

A further embodiment of any of the foregoing embodiments may additionally and/or alternatively include at least one of the first thermoplastic material and the second thermoplastic material comprises a thermoplastic composite material.

A further embodiment of any of the foregoing embodiments may additionally and/or alternatively include a surface treatment on at least one of the attachment and the component.

A further embodiment of any of the foregoing embodiments may additionally and/or alternatively include a fiber reinforcement on the interface layer.

In accordance with the present disclosure, there is provided a process for welding an attachment to a component with an interface layer comprising providing the attachment comprising a first thermoplastic material; providing the component comprising a second thermoplastic material having a melting point temperature different from a melting point temperature of the first thermoplastic material; and welding an interface layer between the attachment and the component; wherein the interface layer is configured to join the first thermoplastic material and the second thermoplastic material together to form a weld, wherein the interface layer comprises a melting point temperature having a value selected from the group consisting of between the melting point temperature of the first thermoplastic material layer and the melting point temperature of the second thermoplastic material layer; or lower than the melting point temperature of the first thermoplastic material layer and the melting point temperature of the second thermoplastic material layer.

A further embodiment of any of the foregoing embodiments may additionally and/or alternatively include the process further comprising performing a surface treatment on at least one of the attachment and the component.

A further embodiment of any of the foregoing embodiments may additionally and/or alternatively include the process further comprising applying a fiber reinforcement to the interface layer.

A further embodiment of any of the foregoing embodiments may additionally and/or alternatively include the process further comprising incorporating the interface layer into at least one of the attachment and the component.

A further embodiment of any of the foregoing embodiments may additionally and/or alternatively include the process further comprising molding the interface layer onto at least one of the attachment and the component.

A further embodiment of any of the foregoing embodiments may additionally and/or alternatively include the process further comprising coating the interface layer onto at least one of the attachment and the component.

A further embodiment of any of the foregoing embodiments may additionally and/or alternatively include the interface layer comprises a material with a lower processing temperature material that chemically interacts and bonds to the first thermoplastic material and the second thermoplastic material in the absence of melting during the welding.

Other details of the interface material are set forth in the following detailed description and the accompanying drawings wherein like reference numerals depict like elements.

DETAILED DESCRIPTION

Figure 1:
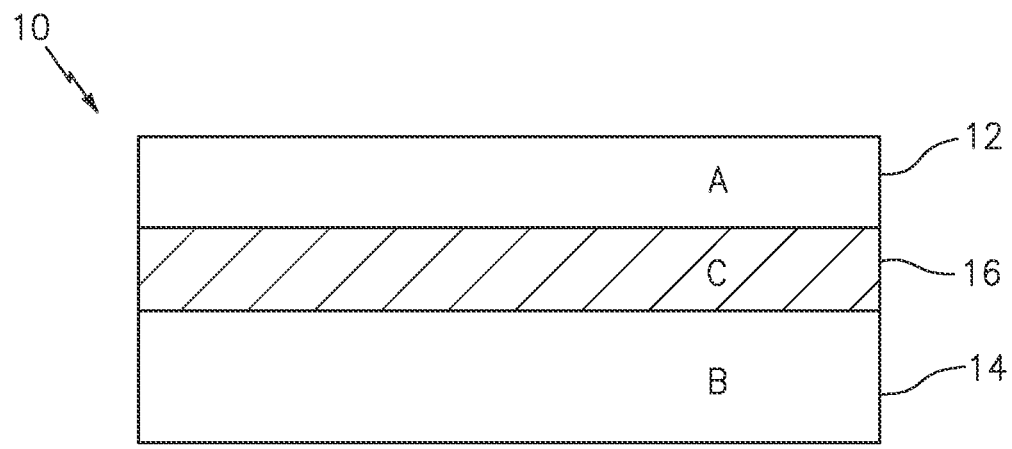
FIG. 1 is a schematic diagram of an exemplary joint between two dissimilar thermoplastic materials and an exemplary interface layer.
Figure 2:
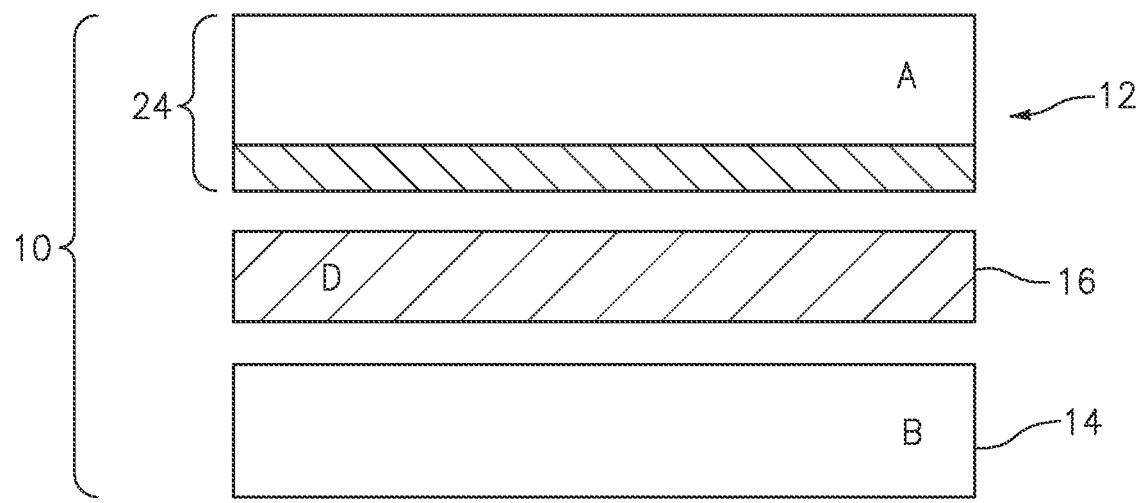
FIG. 2 is an expanded schematic diagram of an exemplary joint between two dissimilar thermoplastic materials with an exemplary interface layer.

Referring FIG. 1 and FIG. 2, an exemplary joint 10 between a first thermoplastic material layer 12 and a second thermoplastic material layer 14 and an interface layer 16 is shown. The first thermoplastic material layer 12 can include one of a unitary thermoplastic and a composite thermoplastic material as shown at FIG. 2. The second thermoplastic material layer 14 can include one of a unitary thermoplastic and a composite thermoplastic material. The interface layer 16 is located between the first thermoplastic material layer 12 and the second thermoplastic material layer 14. The interface layer 16 is configured to join the first thermoplastic material layer 12 and the second thermoplastic material layer 14 together to form the joint 10. In exemplary embodiments, the thermoplastic materials can be at least one of, polycarbonate (PC); polyetherimide (PEI); polyphenylenesulfide (PPS); polyetherketoneketone (PEKK); polyaryletherketone (PAEK); and polyetheretherketone (PEEK), and the like.

The first thermoplastic material layer 12 can have a first melting point temperature A. The second thermoplastic material layer 14 can have a second melting point temperature B. In an exemplary embodiment, the first melting point temperature A is different from the second melting point temperature B. The interface layer 16 can have a melting point temperature C that falls between the first melting point temperature A and the second melting point temperature B. In an exemplary embodiment, the interface layer 16 can comprise a melting point temperature D that is lower than both of the melting point temperatures of the first thermoplastic material layer 12 and the second thermoplastic material layer 14.

Figure 3:
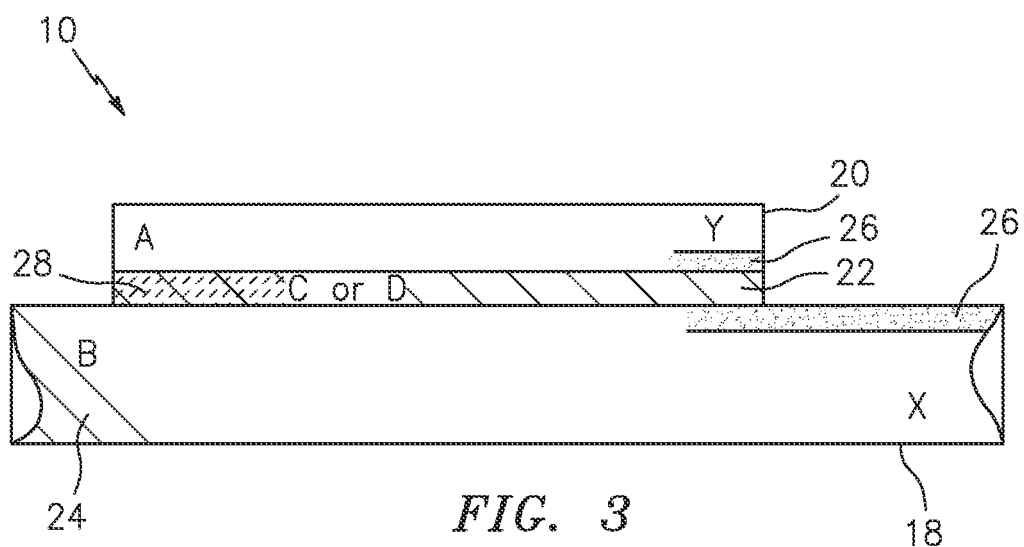
FIG. 3 is a schematic diagram of an exemplary joint between a thermoplastic component, and a thermoplastic attachment and an interface layer.

Referring also to FIG. 3, a component 18 comprising a thermoplastic material X is attached to an attachment 20 comprising a thermoplastic material Y with an interface layer 22 coupled between, as shown. The component 18 can also include a thermoplastic composite material 24. As in the exemplary embodiment shown at FIGS. 1 and 2, the interface layer 22 can include a melting point temperature C with a value between the melting point temperature A of attachment 20 and the melting point temperature B of component 18.

Referring to FIGS. 1 and 2, in an exemplary embodiment, the interface layer 16, can be molded onto the first thermoplastic material layer 12 and/or molded onto the second thermoplastic material layer 14. In an exemplary embodiment, the interface layer 16 can be coated onto the first thermoplastic material layer 12 and/or coated onto the second thermoplastic material layer 14.

Referring to FIG. 3, in an exemplary embodiment, a surface treatment 26 can be applied to the component 18 and/or the attachment 20 proximate to the interface layer 22 to improve the adhesion. The surface treatment 26 can comprise a surface abrasion, a plasma treatment, laser ablation treatment, flame treatment, sanding, grit blasting, chemical treatment, surface abrasion+solvent wipe, and the like.

EXAMPLE 1

An injection molded polycarbonate (PC) attachment is to be welded to a carbon fiber reinforced polyetheretherketone (CF/PEEK) composite tube component. The amorphous PC has a glass transition temperature of ~155 degrees Centigrade (° C.) and molding temperature of ~280° C. while the semi-crystalline PEEK melts at ~343° C. and can be molded at ~390° C. There is a resulting temperature difference (>100° C.) between the materials to be joined. Welding the two materials as-is results in two problems. Firstly, no melting of PEEK will occur at low temperature; therefore no molecular chain diffusion at the joint interface can be accomplished. Secondly, alternatively, a welding temperature high enough to melt the PEEK component, however, at the same time the PC attachment results in losing its shape or even thermal degradation.

The exemplary solution to the problems include the use of an interface layer/surface material that joins the two different thermoplastics together during welding. A material that has wide processing temperature range can be utilized for the interface layer and/or the interface layer can have a material with a lower processing temperature material that chemically interacts and bonds well to the two thermoplastics that are not melted during welding. An exemplary interface layer material can be a thermoplastic polyurethane (TPU). TPU melts at ~180° C. The TPU material can serve as an interface layer for welding PC and PEEK.

The interface layer can be integrated with the high temperature thermoplastic first and then welded with thermoplastics with lower processing temperature, for example, PC. Another exemplary interface layer is Polyetherimide (PEI). PEI has a processing temperature range of 335° C. to 420° C. and a softening point temperature of 217° C. The PEI is compatible with both PC and PEEK, and can serve as an interface layer material for welding PC to PEEK.

More particularly the interface layer can be utilized prior to welding the attachment to the component. An embodiment of utilizing the interface layer prior to welding the attachment to the component can include coating or molding a low temperature interface layer material such as the thermoplastic urethane layer (TPU) on either the PC attachment and/or the CF/PEEK component surface. Another embodiment of utilizing the interface layer prior to welding the attachment to the component can include molding a higher temperature interface layer material such as polyetherimide (PEI) to the CF/PEEK component surface. The PEI is expected to have better integration with PEEK. In welding, PEI also welds (having molecular chain diffusion) with the PC material. The lower welding temperature (much lower than PEEK processing temperature) also presents less challenges in maintaining the CF/PEEK component and PC attachment shape and performance.

In an exemplary embodiment, welding the attachment to the component with the interface layer in-between can include alternative rapid welding methods. Such welding methods can include resistance welding, induction welding, ultrasonic welding or laser welding. In an exemplary embodiment, a reinforcement 28 can be utilized, such as a fiber reinforcement 28 to the interface layer material 22 is preferred when resistance welding is used. The fiber reinforcement 28 to the interface layer 22 can be one of a carbon fiber, glass fiber, Spectra™, Kevlar™ and the like utilized when induction welding is used. Laser welding can be an option when one thermoplastic layer 12, 14 is transparent.

A technical advantage of the disclosed interface material joint includes an interface/surface layer to facilitate the welding of dissimilar thermoplastics and or their composites.

A technical advantage of the disclosed interface material joint includes maintaining the integrity, shape and performance of the component substrates to be welded.

A technical advantage of the disclosed interface material joint includes providing a seal between to the composites being joined.

A technical advantage of the disclosed interface material joint includes providing surface protection to the composites being joined.

A technical advantage of the disclosed interface material joint includes the reduction in processing assembly time and cost.

There has been provided an interface material. While the interface material has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process for welding an attachment to a component with an interface layer comprising:
   providing the attachment comprising a first thermoplastic material;
   providing the component comprising a second thermoplastic material having a melting point temperature of greater than 25 degrees Centigrade different from a melting point temperature of the first thermoplastic material; and
   welding an interface layer between the attachment and the component; wherein the interface layer is configured to join the first thermoplastic material and the second thermoplastic material together to form a weld, wherein said interface layer comprises a melting point temperature having a value selected from the group consisting of between the melting point temperature of the first thermoplastic material layer and the melting point temperature of the second thermoplastic material layer; or lower than the melting point temperature of the first thermoplastic material layer and the melting point temperature of the second thermoplastic material layer.

2. The process of claim 1, further comprising:
   performing a surface treatment on at least one of the attachment and the component.

3. The process of claim 1, further comprising:
   applying a fiber reinforcement to said interface layer.

4. The process of claim 1, further comprising:
   incorporating said interface layer into at least one of the attachment and the component.

5. The process of claim 1, further comprising:
   molding said interface layer onto at least one of the attachment and the component.

6. The process of claim 1, further comprising:
   coating said interface layer onto at least one of the attachment and the component.

7. The process of claim 1, wherein the interface layer comprises a material with a lower processing temperature material that chemically interacts and bonds to the first thermoplastic material and the second thermoplastic material in the absence of melting during the welding.

8. A process for welding an attachment to a component with an interface layer comprising:
   providing the attachment comprising a first thermoplastic material consisting of polycarbonate;
   providing the component comprising a second thermoplastic material consisting of polyetheretherketone; and
   welding an interface layer between the attachment and the component; the interface layer consisting of polyetherimide or thermoplastic polyurethane; wherein the interface layer is configured to join the first thermoplastic material and the second thermoplastic material together to form a weld.

* * * * *